April 2, 1957 W. D. MEAGHER ET AL 2,787,443
CHOCOLATE AND LIKE ENROBING MACHINES
Filed Oct. 12, 1953

INVENTORS:
WALTER DENIS MEAGHER
AND GEORGE MEAGHER
BY:

United States Patent Office 2,787,443
Patented Apr. 2, 1957

2,787,443

CHOCOLATE AND LIKE ENROBING MACHINES

Walter D. Meagher and George Meagher,
St. Annes-on-Sea, England

Application October 12, 1953, Serial No. 385,660

Claims priority, application Great Britain
October 20, 1952

4 Claims. (Cl. 257—4)

This invention relates to enrobing machines for automatically coating articles (for example, blocks of ice-cream or biscuits) with chocolate or other plastic material, either on their upper surfaces only or on both upper and under surfaces, as may be desired.

In connection with such machines, it is known practice to reduce the viscosity of the coating material in a heated container and to deliver it therefrom to an elevated duct or channel from which it descends in the form of a curtain, the articles to be treated being conveyed through this curtain and, in some cases, being simultaneously coated on their under surfaces by suitable means.

A convenient method of heating the container aforesaid is by providing the same with a water jacket whose contents are adapted to be electrically heated by an immersed resistance element under thermostatic control.

The production of a perfectly enrobed article with a high gloss and long shelf-life necessitates the curtain of chocolate or other coating material being maintained at a critical temperature, and experience has shown that this cannot be achieved solely by the use of thermostatic cut-outs associated with the heating element in the water jackets, the temperature of the coating material continuing to rise for some time after the cut-out has operated, and to fall for some time after the heating circuit has been re-made.

The object of the present invention is an improved temperature regulating means which will enable the optimum temperature of the coating material to be maintained within very close limits.

According to this invention, in an enrobing machine wherein the coating material container has a water jacket or jackets adapted for electric heating, we provide for regulation of the heating means through the medium of a pre-set temperature controller associated with some part of the coating material delivery system, as well as for thermostatically controlled circulation of cold water through the said jacket or jackets to counterbalance the effect of said heating means; i. e., to check any further heat-exchange between the container and the associated water jacket or jackets immediately the heating circuit is broken or re-established.

Figure 1:
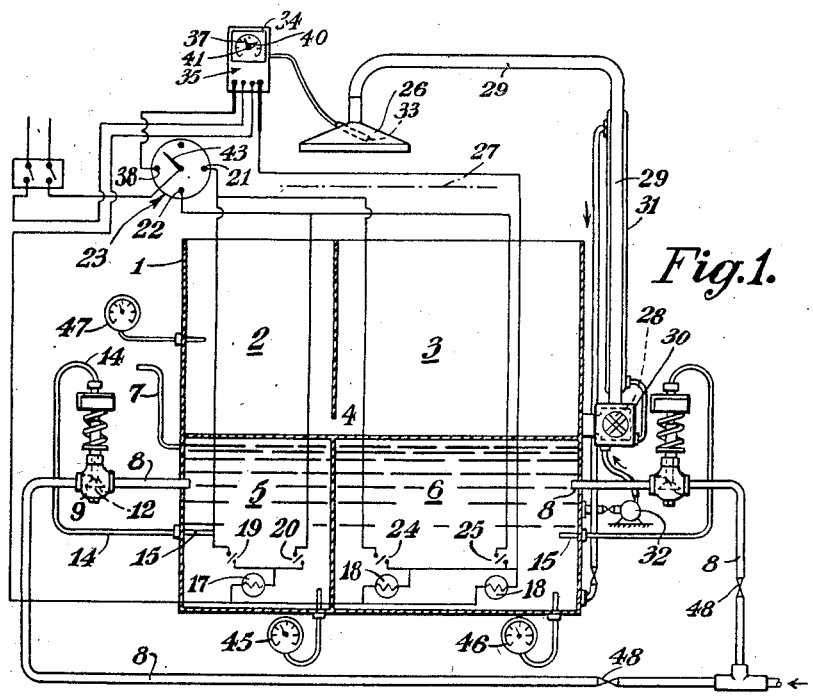
Figure 2:
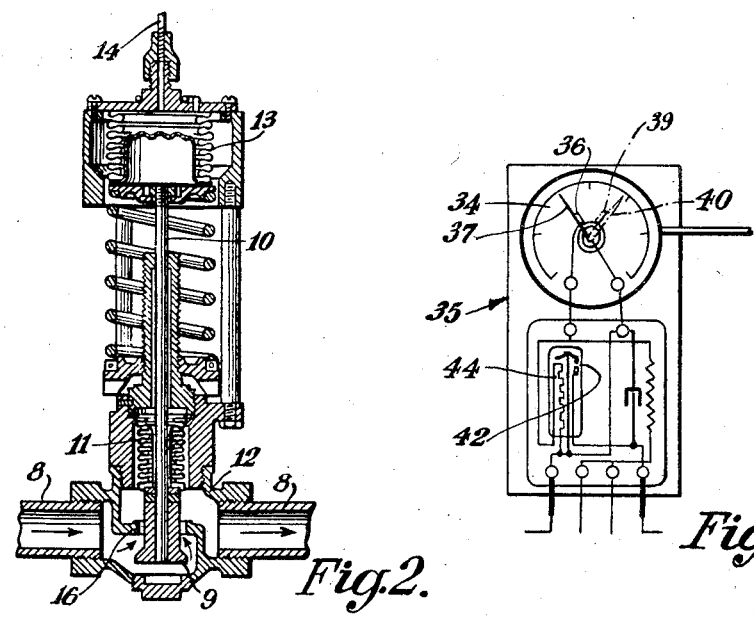
Figure 3:
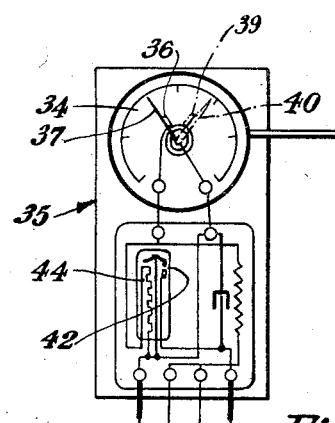

In the accompanying drawings:

Fig. 1 is a diagrammatic view showing the improved temperature regulating means associated with the coating material container of an enrobing machine, Fig. 2 is a sectional side elevation, drawn to an enlarged scale, of one of the thermostatic water valves shown in Fig. 1, Fig. 3 is a part-sectional elevation, also to an enlarged scale, of the pre-set temperature controller shown in Fig. 1.

In the example illustrated, the invention is applied to a known form of automatic chocolate enrobing machine in which the chocolate container or "kettle" 1 has "seeding" and "working" compartments 2, 3, intercommunicating by means of a small orifice 4 and provided at their lower parts with separate hot-water jackets 5, 6, respectively, which have a common overflow 7 at the top.

Each of these jackets 5, 6, is supplied with mains water through a pipe 8 containing a valve 9 (see Fig. 2) whose actuating rod 10 is sealed by a bellows 11, as shown in Fig. 2, the valve casing 12 having mounted above it a spring-loaded bellows chamber 13 to which the rod 10 is attached and which is connected by a small-bore tube 14 to a thermostat head 15 in the water-jacket. The chamber 13 expands or contracts in accordance with the vapour pressure of a liquid in the head 15, so that any rise (or fall) in the jacket temperature is countered by an automatic movement of the valve 9 towards (or away) from its seating 16, whereby the rate of admission of cold water is regulated so as to maintain the jacket at a constant temperature. Conduits 8, valves 9 and the common overflow 7 constitute means for admitting cooling liquid and removing heated liquid from the jackets 5 and 6. The thermostat heads 15 in the jackets and connected to the bellows chambers 13 of the valves, respectively, form means automatically operating said cooling liquid admitting and heated liquid removing means.

Immersed electric heating elements are provided within the water jackets 5, 6, a convenient arrangement being to have a single heater 17 in the water jacket 5 of the "seeding" compartment 2 and two parallel-connected heaters 18 in the other jacket 6.

In series with the single heater 17, but in parallel with one another, are two thermostatic cut-outs 19, 20, respectively connected to the stationary contacts 21, 22, of a four-way switch 23, the same contacts being also connected to another pair of thermostatic cut-outs 24, 25, which are similarly associated with the twin heaters 18 aforesaid.

To produce the enrobing curtain, molten chocolate from the "working" compartment 3 of the container or "kettle" 1 (previously tempered in, or admixed with "tempered" chocolate from the "tempering" compartment 2) is pumped to a fishtail nozzle 26 suitably arranged above the conveyor 27 for the articles to be coated, the casing of the chocolate pump 28 and at least part of its delivery pipe 29 being provided with jackets (30, 31 respectively) through which hot water from the adjacent main jacket 6 is circulated by means of a separate pump 32.

Mounted in the fishtail nozzle 26, or in any part of the chocolate delivery pipe 29, is the bulb 33 of a dial thermometer 34 forming part of an adjustable temperature controller 35 (see Fig. 3).

A contact 36 on the needle 37 of this thermometer 34 is electrically connected to a third stationary contact 38 of the four-way switch 23 and co-operates with an insulated contact 39 on a concentric pointer 40 which is adjustable over the thermometer dial by means of a knurled knob 41 and which is electrically connected to the thermostatic cut-outs 24, 25, controlling the twin heaters 18.

Normally the controller contacts 36, 39, are shorted-out by way of a hot-wire vacuum switch 42, so that current can reach the heaters 18 when the movable contact 43 of the four-way switch 23 is brought into engagement with the contact 38 of the latter, and such energization of the heaters is continued until the enrobing temperature (indicated by the needle 37) reaches the value to which the pointer 40 has been manually pre-set.

When this occurs, current is automatically diverted from the hot-wire winding 44 of the switch 42, which thereupon opens to break the heater circuit. The adjustable temperature controller 35, including the bulb 33 in the fishtail nozzle 26 constitute, therefore, actuating means for automatically actuating the heaters 18 while the temperature of the coating material delivered by the delivering means 28, 29, 26 is below a predetermined temperature, that is below the value to which the pointer 40 has been set.

Further dial thermometers (44, 45, 46, 47 respectively) are provided to indicate the individual temperatures of the two main water jackets 5, 6, and of the chocolate in the "seeding" compartment 2.

When enrobing is to take place, the conveyor 27 for the articles to be coated is set in motion, as well as the means (not shown) for agitating the chocolate in the container or "kettle" 1 and the pump 28 whereby chocolate is delivered to the fishtail nozzle 26 or other curtain-forming device.

The mains supply to each of the water valves 9 is turned on, as at 48, and the movable contact 43 of the four-way switch 23 is moved to engage the contact 38, this being known as the "pump running" position.

Under these conditions, as already explained, the heaters 18 for the "working" compartment are fed with current by way of the cut-out switch 42 in the controller 35, the pointer 40 of the latter having previously been set to the optimum enrobing temperature for the coating material in use.

In the case of so-called "chocolate converture," this temperature will be approximately 89° F., corresponding to a water temperature of 90° F. in the jacket 6 of the working compartment 3, which is of course in constant communication with the "seeding" compartment 2.

When during the enrobing operation the temperature of the water drops slightly due to admission of cold water as will be explained hereinafter, the thermometer contacts 36, 39 open, and the heaters 18 are energized to heat the water to a temperature of substantially 90°.

On attainment of the desired enrobing temperature, the controller cut-out 42 deenergizes the heaters 18 as aforesaid, and simultaneously the adjacent thermostatically-operated valve 9 opens to cool down the jacket 6 to (say) 88° F. and thus prevent any further rise in temperature of the "working" chocolate.

The thermostatically operated valve 9 is set to open at 88°, and to close at around 90°. When the temperature of the chocolate at 33 drops, the heaters 17, 18 are again energized by the separating contacts 36 and 39, and the water in jacket 6 is heated to a temperature of 90°. This raises a temperature of the chocolate to 89°, and causes disconnecting of the heaters 18. Since the thermostat valve 9 opens at 90°, the water in the jacket 6 is cooled to 88° by admission of cold water, whereupon the valve 9 closes and the operation is repeated. These control operations take place during the enrobing operation.

Before the enrobing operation starts, the chocolate in kettle 3 may have a much lower temperature than 89°, and consequently the heaters 18 will heat the water in jacket 6 to a temperature higher than 90° while the temperature of the chocolate in kettle 3 gradually goes up to 89°. At 89° the control operation of the thermometer contacts 36 and 39 starts, and the heater 18 is disconnected. At that time, however, the temperature of the water in jacket 6 may be much higher than 90°, which would cause during the following enrobing operation an increase of the temperature at 33 above the desired critical temperature of 89°. It will be understood that the thermometer contacts 36 and 39 are incapable of preventing an increase of the chocolate temperature above 89°, but are only capable of preventing a dropping of such temperature below the desired temperature. Therefore, it is necessary that the water temperature in the jacket 6 is immediately controlled when it tends to go up above 90°. It is for this purpose that the thermostat control water supply valve 9 is provided. When the temperature in the jacket 6 rises above 90°, cold water is supplied, until the water temperature drops to 88° which will cause energizing of the heaters 18 by thermometer contacts 37 and 40 if the chocolate temperature drops below 89°.

Consequently, the cold water supply effected by the thermostat valve 9 may start even though the heaters 18 still operate to heat the water, and the effect of the heaters may cause rising of the water temperature in spite of the cold water supply through valve 9. However, when the heaters 18 are disconnected by the thermometer contacts 37, 39, the cold water supply immediately reduces the temperature of the water to the desired temperature.

When enrobing is not in progress, but it is desired to maintain the contents of the container or "kettle" 1 ready for use at short notice (for example, overnight or during mealtime breaks), the movable contact 43 of the four-way switch 23 is left in the "hold-over" position; i. e. engaging the stationary contact 22, so that current is fed to the heaters 17, 18, through the thermostatic cut-outs 20, 25, respectively, the cut-out 20 associated with the "seeding" compartment 2 being set to open at 90° F. and the cut-out 25 at 95–100° F.

With the jacket temperatures aforesaid, the chocolate in the "seeding" compartment 2 will be kept at 86–87° F. and that in the "working" compartment 3 at 95–97° F., it being understood that, under such "hold-over" conditions, the temperature controller 35 is out of action and the mains supply to the water valves 9 which feed the jackets 5, 6, is shut off at 48.

When such supply is restored prior to the next enrobing operation, the thermostatically-operated valves 9 at once operate to bring down the temperatures of the jackets 5, 6, to 85° F. and 90° F. respectively, which corresponds to 86°–87° F. and 88° F. in the compartments 2, 3.

In the event of tests of the finished or partly-finished product showing that the "temper" of the chocolate is unsatisfactory, the four-way switch 23 may be turned to a "tempering" position, i. e. with the movable contact 43 engaging the contact 21, which again cuts the temperature controller 34 out of operation, whilst allowing current to reach the heaters 17, 18, by way of the other thermostatic cut-outs 19, 24, these latter being set to open at lower temperatures than the cut-outs 20, 25, operative under "hold-over" conditions. During "tempering," of course, the mains supply to the thermostatically-controlled water valves 9 is shut off at 48, in the same way as during "hold-over" periods.

Whilst reference has been made hereinbefore to the use of a single heater 17 in the jacket 5 and twin heaters 18 in the jacket 6, it should be understood that this is purely by way of example, and that the number of heaters and thermostatic cut-outs may be varied as desired.

We claim:

1. In an enrobing machine, in combination, a heating container for heating coating material; delivering means for delivering from said container coating material heated therein; a liquid-containing jacket forming at least part of a wall of said container; heating means spaced from said container wall and located in said jacket for heating liquid therein, so that heat is transferred to said wall only through liquid in said jacket; actuating means for automatically actuating said heating means while the temperature of the coating material delivered by said delivering means is below a predetermined temperature, so as to cause increase of the temperature of said liquid in said jacket resulting, in turn, in increase of the temperature of the container wall of which the jacket forms part, which in turn results in subsequent heating of the coating material in said heating container and increase of the temperature of said coating material in said delivering means; means for admitting cooling liquid and removing heated liquid from said jacket in order to replace heated liquid in said jacket with cooling liquid; and means automatically operating said cooling liquid admitting and heated liquid removing means while the temperature of the liquid in the jacket is above a second predetermined temperature, whereby said heating means actuated by said actuating means in dependence on the temperature of the delivered coating material, is prevented from raising the temperature of the liquid in said jacket substantially above said second predetermined temperature to undesirably overheat the coating material in said container, the admitted cooling liquid being located between said heating means and container wall to contact the latter directly.

2. An enrobing machine as defined in claim 1, and in which said heating means are electric heating means.

3. An enrobing machine as defined in claim 1, and in which said means for admitting cooling liquid and removing heated liquid from said jacket include conduit means communicating with said jacket for supplying cooling liquid thereto, overflow means at the top of the jacket for discharging heated liquids therefrom, and valve means carried by said conduit means for controlling the rate of flow of cooling liquids through said conduit means into said jacket.

4. An enrobing machine as defined in claim 3, and in which said means automatically operating said cooling liquid admitting and heating liquid removing means include thermostatic control means communicating with the interior of said jacket for sensing the temperature of a liquid therein and being operatively connected to said valve means for controlling the extent to which said valve means is opened so as to thereby control the admittance of cooling liquid to said jacket in accordance with the temperature of the liquid in said jacket.

References Cited in the file of this patent
UNITED STATES PATENTS

| | | |
|---|---|---|
| 752,768 | Goodwin | Feb. 23, 1904 |
| 1,524,636 | Bausman | Jan. 27, 1925 |
| 1,565,428 | Dixon | Dec. 15, 1925 |
| 1,685,647 | Shroyer | Sept. 25, 1928 |
| 1,937,042 | Kercher | Nov. 28, 1933 |
| 2,042,609 | Lewis | June 2, 1936 |
| 2,100,326 | Getchell | Nov. 30, 1937 |
| 2,192,659 | Young | Mar. 5, 1940 |
| 2,250,207 | Schneider | July 22, 1941 |
| 2,255,986 | Rapisarda | Sept. 16, 1941 |
| 2,450,478 | Johnson | Oct. 4, 1948 |
| 2,489,049 | Root | Nov. 12, 1949 |
| 2,508,988 | Bradley | May 23, 1950 |
| 2,611,850 | Walton | Sept. 23, 1952 |
| 2,638,329 | Weygand et al. | May 12, 1953 |